US012759232B2

(12) United States Patent
Fischer et al.

(10) Patent No.: US 12,759,232 B2
(45) Date of Patent: Oct. 13, 2026

(54) POSITIONING SYSTEM FOR AN ADDITIVE MANUFACTURING SYSTEM, AND ADDITIVE MANUFACTURING SYSTEM

(71) Applicant: KUMOVIS GMBH, Taufkirchen (DE)

(72) Inventors: Stefan Fischer, Iffeldorf (DE); Miriam Haerst, Munich (DE); Stefan Leonhardt, Munich (DE); Sebastian Pammer, Munich (DE)

(73) Assignee: KUMOVIS GMBH, Taufkirchen (DE)

( * ) Notice: Subject to any disclaimer, the term of this patent is extended or adjusted under 35 U.S.C. 154(b) by 244 days.

(21) Appl. No.: 17/597,855

(22) PCT Filed: Jul. 27, 2020

(86) PCT No.: PCT/EP2020/071165
§ 371 (c)(1),
(2) Date: Jan. 26, 2022

(87) PCT Pub. No.: WO2021/032410
PCT Pub. Date: Feb. 25, 2021

(65) Prior Publication Data

US 2022/0281169 A1 Sep. 8, 2022

(30) Foreign Application Priority Data

Aug. 20, 2019 (DE) ..................... 10 2019 122 291.5

(51) Int. Cl.
*B29C 64/227* (2017.01)
*B33Y 30/00* (2015.01)

(52) U.S. Cl.
CPC ............ *B29C 64/227* (2017.08); *B33Y 30/00* (2014.12)

(58) Field of Classification Search
CPC ... B29C 64/227; B29C 64/232; B29C 64/236; B29C 64/295; B29C 64/25;
(Continued)

(56) References Cited

U.S. PATENT DOCUMENTS 6,033,301 A 3/2000 Suwa
6,135,683 A * 10/2000 Kim .................... B23Q 1/5462 409/235

(Continued)

FOREIGN PATENT DOCUMENTS

CN 105799173 A * 7/2016
CN 208020752 U 10/2018

(Continued)

OTHER PUBLICATIONS

Espacenet machine translation of Wu et al., CN 208020752 U, originally published 2018 (Year: 2018).*

(Continued)

*Primary Examiner* — Susan D Leong
*Assistant Examiner* — Jennifer L Groux
(74) *Attorney, Agent, or Firm* — McCoy Russell LLP

(57) ABSTRACT

The present disclosure relates to a positioning system for an additive manufacturing system, in particular for a 3D printer, the positioning system being a positioning system for positioning a print head, wherein the positioning system allows movements in several degrees of freedom and the positioning system is of two-part design such that a part of the degrees of freedom is made possible by a first part of the positioning system and a further part is made possible by a second part of the positioning system.

The present disclosure further relates to an additive manufacturing system, in particular a 3D printer, comprising at least one positioning system.

6 Claims, 2 Drawing Sheets

(58) Field of Classification Search
CPC .... B29C 64/205; B29C 64/209; B25J 9/1623; B25J 9/003–0078; B25J 9/009; B23Q 1/5462; B33Y 30/00
See application file for complete search history.

(56) References Cited

U.S. PATENT DOCUMENTS

| | | | | |
|---|---|---|---|---|
| 6,557,235 | B1 * | 5/2003 | Katz | B23Q 7/04 414/749.6 |
| 6,722,872 | B1 | 4/2004 | Swanson et al. | |
| 6,817,941 | B1 | 11/2004 | Gatov | |
| 2009/0314391 | A1 | 12/2009 | Crump et al. | |
| 2015/0110911 | A1 | 4/2015 | Snyder | |
| 2015/0176956 | A1 | 6/2015 | Pettersson et al. | |
| 2015/0314527 | A1 * | 11/2015 | Kline | B33Y 30/00 425/447 |
| 2016/0332296 | A1 * | 11/2016 | Kurnianto | B29C 48/252 |
| 2017/0050278 | A1 * | 2/2017 | Jaster | B25J 9/1045 |
| 2018/0361729 | A1 * | 12/2018 | Gibson | G01B 11/24 |
| 2020/0147783 | A1 * | 5/2020 | Crawford | B25J 9/102 |
| 2020/0189184 | A1 * | 6/2020 | Schoeneborn | B22F 10/20 |
| 2021/0114299 | A1 * | 4/2021 | Schreiner | B29C 64/209 |

FOREIGN PATENT DOCUMENTS

| | | | | | |
|---|---|---|---|---|---|
| CN | 108973124 | A | * | 12/2018 | B29C 64/20 |
| CN | 109016508 | A | * | 12/2018 | B29C 64/205 |
| DE | 102015111504 | A1 | | 1/2017 | |
| EP | 1204517 | B1 | | 4/2009 | |
| EP | 2261009 | A1 | | 12/2010 | |
| EP | 3023228 | A1 | | 5/2016 | |
| EP | 3173233 | A1 | | 5/2017 | |
| FR | 3073443 | A1 | * | 5/2019 | |
| WO | WO-2007093070 | A1 | * | 8/2007 | B23Q 1/38 |
| WO | 2016063198 | A1 | | 4/2016 | |
| WO | 2017040675 | A1 | | 3/2017 | |
| WO | 2017108477 | A1 | | 6/2017 | |
| WO | 2019068581 | A1 | | 4/2019 | |

OTHER PUBLICATIONS

Espacenet machine translation of Li et al., CN 109016508 A (originally published 2018) (Year: 2018).*
Machine translation of Boyard, FR 3073443 A1 (originally published 2019) (Year: 2019).*
ISA European Patent Office, International Search Report Issued in Application No. PCT/EP2020/071165, Oct. 21, 2020, WIPO, 3 pages.

* cited by examiner

POSITIONING SYSTEM FOR AN ADDITIVE MANUFACTURING SYSTEM, AND ADDITIVE MANUFACTURING SYSTEM

CROSS REFERENCE TO RELATED APPLICATIONS

The present application is a U.S. National Phase of International Application No. PCT/EP2020/071165 entitled "POSITIONING SYSTEM FOR AN ADDITIVE MANUFACTURING SYSTEM, AND ADDITIVE MANUFACTURING SYSTEM," and filed on Jul. 27, 2020. International Application No. PCT/EP2020/071165 claims priority to German Patent Application No. 10 2019 122 291.5 filed on Aug. 20, 2019. The entire contents of each of the above-listed applications are hereby incorporated by reference for all purposes.

TECHNICAL FIELD

The present disclosure relates to a positioning system for an additive manufacturing system, in particular of a 3D printer, as well as to an additive manufacturing system, in particular a 3D printer.

BACKGROUND AND SUMMARY

In connection with the 3D printing of plastics in particular for medical applications (e.g. for implants), the currently achievable component quality is in the focus of many scientific studies. Two of the most important challenges, which play a decisive role with regard to component quality, are component mechanics and component tolerance as well as the component sterility or component particle precipitation, but also the temperatures occurring in 3D printing and the necessary temperature management are not unproblematic.

For example, a 3D printing device, in particular an FFF printing device, comprising at least one print head unit is already known from DE 10 2015 111 504 A1, said print head unit being provided in at least one operating state for melting a print material formed at least partially by a high-performance plastic material, in particular a high-performance thermoplastic polymer.

Further, EP 2 261 009 A1 discloses a device and a method for producing a three-dimensional object, said device comprising a vacuum pump coupled to a feed reservoir for generating an air flow through said feed reservoir.

Moreover, EP 3 023 228 A1 shows an additive manufacturing device having a gas flow system in order to provide a gas flow over the area of the build-up platform of the additive manufacturing device.

Furthermore, EP 3 173 233 A1 discloses a three-dimensional manufacturing device with a processing chamber heated by a processing chamber heating unit provided for this purpose.

In addition, U.S. Pat. No. 6,033,301 A discloses a combined fan-filter unit which is provided for filtering the air of an air circuit in a clean room.

U.S. Pat. No. 6,722,872 B1 further shows a three-dimensional modelling device which is intended for building up three-dimensional objects within a heated build-up compartment.

In addition, a diffuser for generating a uniform air flow within a process chamber is shown in U.S. Pat. No. 6,817,941 B1, said process chamber being used, for example, in the production of semiconductor chips.

Furthermore, US 2015/110911 A1 shows an environment monitoring or control unit, which is used with additive manufacturing technologies, for example, as an interface to its respective environments.

Besides, WO 2016/063198 A1 shows a method and a device for manufacturing three-dimensional objects by "Fused Deposition Modelling", wherein the manufacturing device comprises radiation heating elements which can heat a surface of the object to be manufactured exposed to them.

In addition, a clean room technology for 3D printers and so-called bio-printers is known from WO 2017/040675 A1.

Further, a method for producing a three-dimensional object with a "Fused Deposition Modelling" printer can be taken from WO 2017/108477 A1.

Furthermore, a 3D printer is known from EP 1 204 517 B1, in which the platform can be moved up and down in the build-up chamber by means of a mechanic system located outside the heating chamber. In addition, the positioning mechanism of the print head is arranged in three degrees of freedom outside of the build-up chamber.

Based on the solutions proposed in the state of the art, the problem of insufficient component sterility especially for medical applications and the problem of the arising temperatures acting on the components of the printer and thus influencing the accuracy with which printing can be carried out still exists with regard to these additive manufacturing devices.

Furthermore, it is important to improve the positioning of the print head in order to achieve a higher accuracy in the area of the build-up and the printing of the component.

It is therefore the object of the present disclosure to further develop a positioning system as well as an additive manufacturing system of the aforementioned kind in a beneficial manner, in particular with a view to be able to achieve a better printing accuracy.

This object is achieved according to the disclosure by a positioning system. According to this, provision is made that a positioning system for an additive manufacturing system is provided, in particular for a 3D printer, wherein the positioning system is a positioning system for positioning a print head, the positioning system allows movements in several degrees of freedom and the positioning system is of two-part design such that a part of the degrees of freedom is made possible by a first part of the positioning system and a further part is made possible by a second part of the positioning system.

The disclosure is based on the fundamental idea of providing a part of the degrees of freedom by a first part of the positioning system and a second part of the positioning system, so that the positioning system can be divided into at least two, possibly also several components. Such a division makes it possible to arrange certain areas of the positioning system in different environments of the printer than is the case with the other parts of the positioning system. On the whole, this also allows a higher accuracy to be achieved, as environmental influences can be reduced here, which can improve the accuracy. In particular, the first and second part of the positioning system are movable mechanisms or mechanisms which are in motion during operation to allow the corresponding degrees of freedom and movement of the print head.

In particular, provision may be made that the first part of the positioning system is thermally decoupled from the second part of the positioning system. Such thermal decoupling makes it possible that the various parts of the positioning system do not influence each other thermally. This also allows a higher accuracy to be achieved. This division can also be used to arrange certain parts of the positioning system in a “clean” area and an “unclean” area in connection with clean room applications. This can be used, for example, if certain parts of the positioning system tend to produce contaminants during operation, e.g. by abrasion or lubricants or the like.

The first part of the positioning system may also be encapsulated. For this purpose, appropriate sealing elements may be provided, such as shaft sealing rings and the like. This encapsulation serves to prevent contaminations from entering the clean room area.

In addition, provision may be made that the thermal decoupling comprises at least one first heat reflector, in particular at least one air gap and at least one second heat reflector being additionally provided in addition to the first heat reflector. This makes it possible to achieve a first heat zone for the first part of the positioning system and a second heat zone for the second part of the positioning system. Having an appropriate design, already one heat reflector can be sufficient for an appropriate and necessary thermal insulation.

In this context, it is basically conceivable that the thermal decoupling is actually accompanied by a mechanical decoupling at this point in the area of the thermal coupling. This also ensures that heat can be transferred from the first area to the second area, i.e. from the first part of the positioning system to the second part of the positioning system, by means of appropriate mechanical connecting parts. The thermal decoupling can be achieved alternatively or additionally via separating elements, which are poor heat conductors. For this purpose, ceramics and/or other suitable insulation and/or insulating materials, such as insulating wool, insulating boards, etc., can be used.

It is further conceivable that in operation the first part of the positioning system is arranged in a warmer zone than the second part of the positioning system. It is in particular conceivable that a part of the positioning system is arranged directly in the build-up chamber, which is usually heated in operation. The second part of the positioning system may then be arranged in a cooler zone on the far side of the thermal decoupling, in particular also outside the build-up chamber.

In particular, provision may be made that the first part of the positioning system is and/or comprises at least one linear guide. The linear guide is relatively insensitive in thermal terms and can be operated in a very high temperature range without any loss of accuracy.

Further, provision may be made that the first part of the positioning system is exclusively constituted by one or more linear guide(s). In this case, the first part of the positioning system would only be responsible for one degree of freedom, for example for the up and down movement. However, it is also conceivable that further movements would be possible in this context. In this case, further linear guides would have to be arranged.

Moreover, provision may be made that the second part of the positioning system is and/or comprises at least one recirculating ball screw. These recirculating ball screws have a very high accuracy and can be coupled to the linear guide via a rod or bar. If a rod or bar is used, it is advisable to provide a shaft seal. The shaft seal serves in particular to prevent cold air or particles from entering the heated room or clean room.

Alternatively, instead of a recirculating ball screw, a belt drive or a chain drive could be used as well.

The present disclosure further relates to an additive manufacturing system, in particular a 3D printer, comprising at least one positioning system as described above.

BRIEF DESCRIPTION OF THE FIGURES

Further details of the disclosure shall now be described on the basis of an exemplary embodiment shown in the drawings in which.

DETAILED DESCRIPTION

Figure 1:
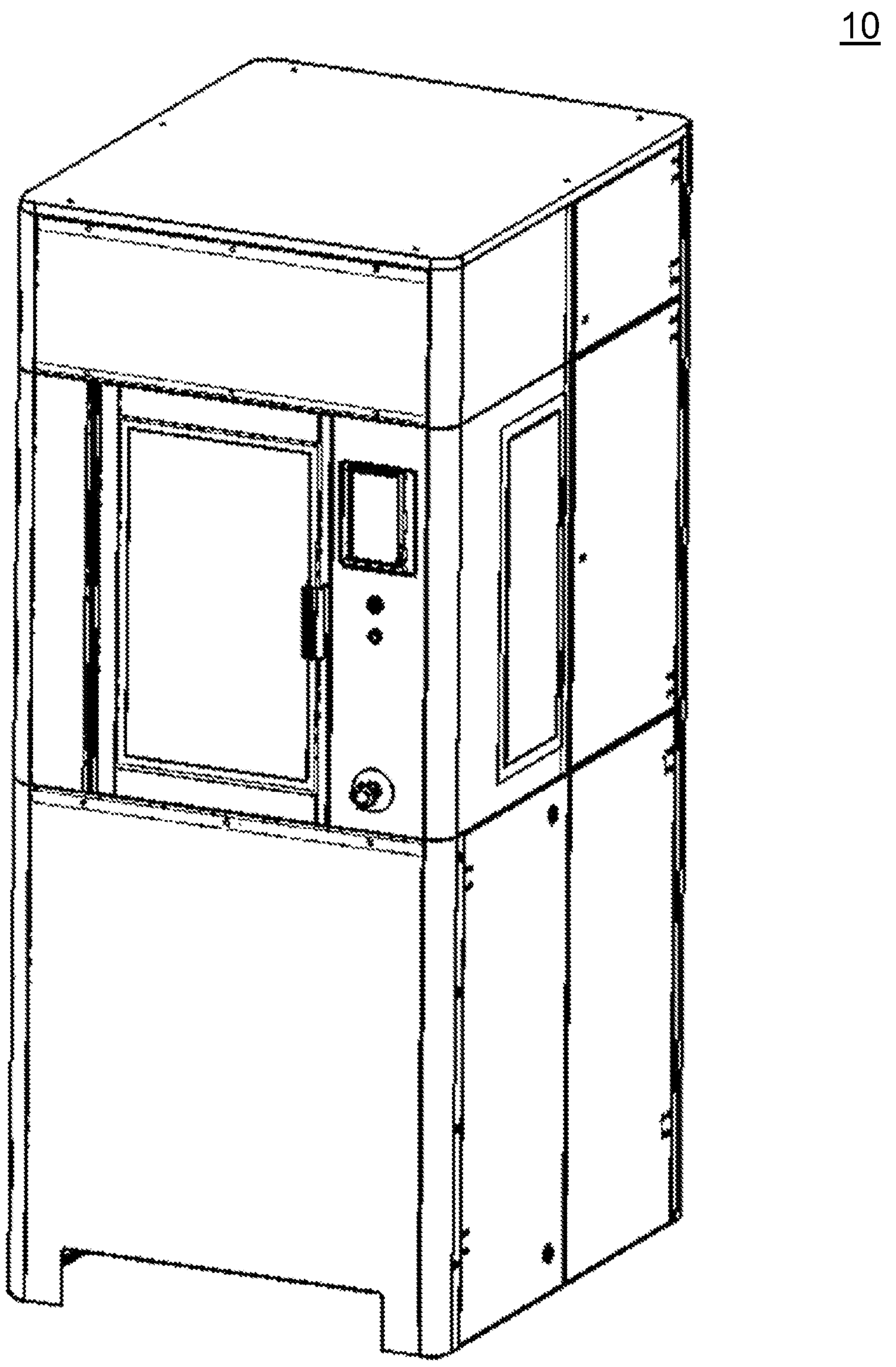
FIG. 1 is a perspective view of an exemplary embodiment of the additive manufacturing system according to the disclosure.
Figure 2:
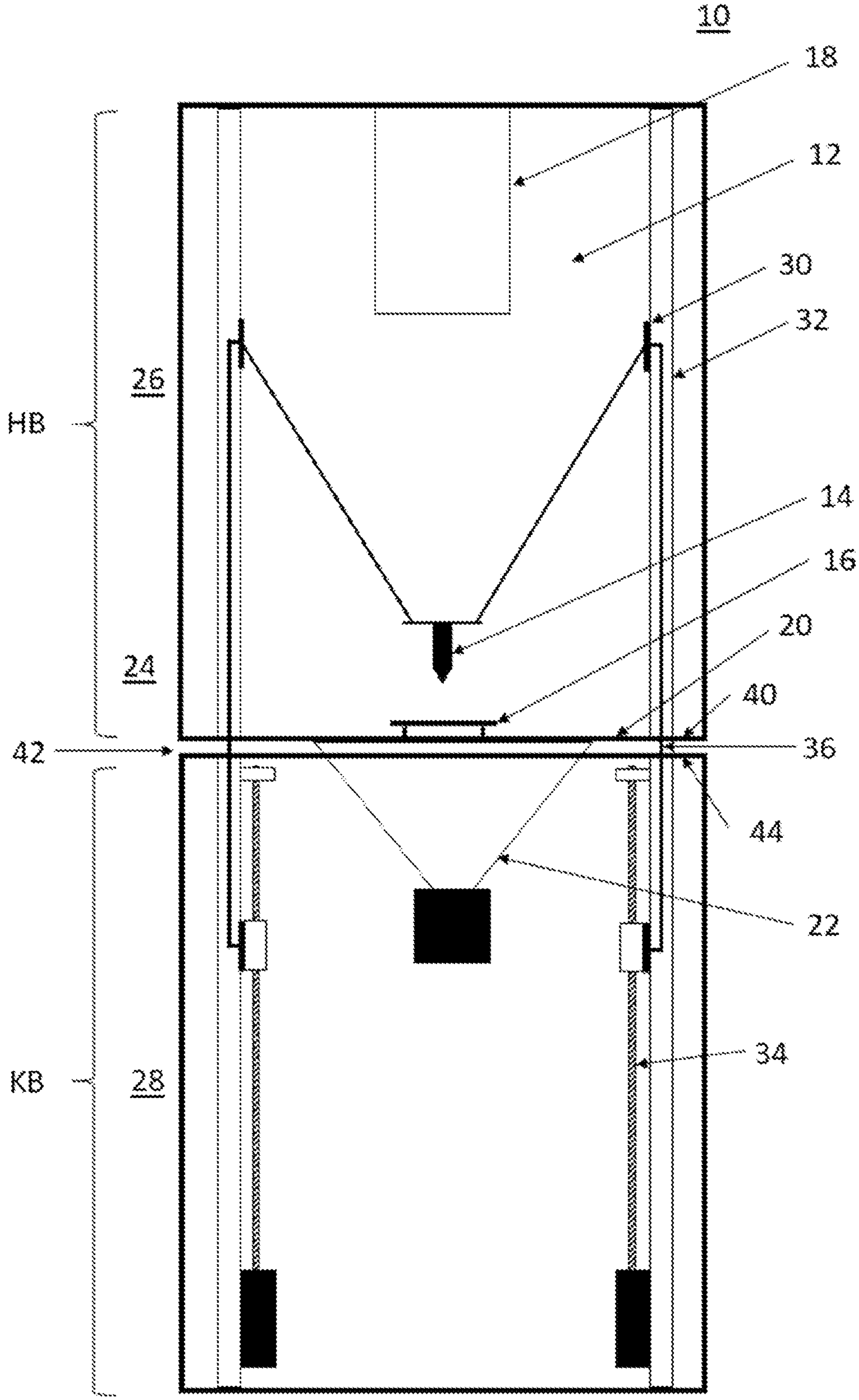
FIG. 2 is a schematic view of the additive manufacturing system according to FIG. 1.

Here, FIG. 1 and FIG. 2 show in a schematic, perspective illustration an additive manufacturing system according to the disclosure as well as a positioning system according to the disclosure.

The Figure shows the additive manufacturing system 10, here in an implementation as a 3D printer.

The outer panelings of the additive manufacturing system 10 are not shown here, only the essential components inside the additive manufacturing system 10.

The additive manufacturing system 10 has a build-up chamber 12.

The build-up chamber 12 houses a print head 14.

The print head 14 is located above a plate 16 on which components can be built up.

An air supply 18 is provided above the print head 14.

Below the build-up chamber 16, there is a bottom element 20 comprising a funnel and the corresponding extraction system and air treatment 22.

A positioning system 24 is also provided, wherein the positioning system 24 is designed as a two-part kinematic system.

The positioning system 24 has a first part of the positioning system 26 in a first portion HB and a second part of the positioning system 28 in a cool area KB. The portion HB may simultaneously be the clean room area and the part KB may be the non-clean room area.

The hot area HB is formed in the area of the build-up chamber 12.

Only linear guides 30 are used in the hot area HB.

These are only used for vertical positioning. The linear guides 30 are therefore only used to enable an up and down movement of the print head 14. The linear guides 30 are arranged on the vertical columns 32.

Recirculating ball screws 34 are used in the cool area KB, which is located below the build-up chamber 12 in the set up and assembled area of the additive manufacturing system 10.

These recirculating ball screws 34 are coupled to the linear guides 30 via a rod or bar.

The hot area HB is thermally decoupled from the cool area KB via a thermal decoupling 36.

This is done via separating elements 38, which are poor heat conductors. Ceramics or similar materials can be used for this purpose.

The thermal decoupling 36 may have a first heat reflector 40, at least one air gap 42 and at least one second heat reflector 44.

The first heat reflector 40 may be designed, for instance, by the bottom plate of the build-up chamber 12.

The second heat reflector 44 may be a plate 16 or a corresponding reflector placed below the build-up chamber 12. The reflector can be replaced or extended by a medium-based cooling system. Air cooling or water cooling are conceivable here.

Due to the high temperatures required in the build-up chamber 12, which can be up to 350° C. which is necessary for good mechanical properties and reproducibility of the component, the positioning system 24 has a two-part design.

In the hot area HB, i.e. the build-up chamber 12, linear guides 30 are used which can withstand these temperatures. Furthermore, the linear guides 30 are also suitable for clean room applications.

In the cool area KB below the build-up chamber 12, recirculating ball screws 34 are used, which also have a very high accuracy, but only in a much lower temperature range than is the case in the build-up chamber 12.

The thermal decoupling 36 prevents the temperature from being transferred from the first part of the positioning system 26 to the second part of the positioning system 28.

The drive system and other components of the positioning system 24 are also located outside of the build-up chamber 12, which also avoids further particle ingress into the build-up chamber 12 and thus onto the component.

In principle, it is also conceivable to use several positioning systems 24 and to stack them on top of each other, so that several identical components can be produced simultaneously.

REFERENCE NUMERALS

10 additive manufacturing system
12 build-up chamber
14 print head
16 plate
18 air supply
20 bottom element
22 funnel
24 positioning system
26 first part of the positioning system
28 second part of the positioning system
30 linear guides
32 vertical columns
34 recirculating ball screws
36 thermal decoupling
38 separating elements
40 first heat reflector
42 air gap
44 second heat reflector
HB hot area
KB cool area

The invention claimed is:

1. An additive manufacturing system, comprising a build-up chamber enclosed by outer panelings of the additive manufacturing system and a positioning system being suited for positioning a print head, wherein the positioning system allows movements in several degrees of freedom and the positioning system is of two-part design, wherein a part of the degrees of freedom is made possible by a first part of the two-part design of the positioning system and a further part of the degrees of freedom is made possible by a second part of the two-part design of the positioning system, wherein the first part of the positioning system is arranged so as to be thermally decoupled from the second part of the positioning system by at least one first heat reflector, wherein the first part of the positioning system comprises one or more linear guides housed in the build-up chamber and the second part of the positioning system comprises at least one recirculating ball screw positioned outside the build-up chamber, wherein a drive system of the positioning system is located outside the build-up chamber, and wherein the additive manufacturing system includes a rod or bar that is coupled to the one or more linear guides and the at least one recirculating ball screw, and the rod or bar extends through a bottom element below the build-up chamber.

2. The additive manufacturing system according to claim 1, wherein in operation the first part of the positioning system is arranged in a warmer zone than the second part of the positioning system.

3. The additive manufacturing system according to claim 1, wherein the first part of the positioning system is exclusively constituted by the one or more linear guides.

4. The additive manufacturing system according to claim 1, wherein the second part of the positioning system comprises at least one threaded drive and/or belt drive and/or chain drive.

5. The additive manufacturing system according to claim 1, wherein the additive manufacturing system is a 3D printer.

6. The additive manufacturing system according to claim 1, wherein the first part of the positioning system is the thermally decoupled from the second part of the positioning system by at least one air gap and at least one second heat reflector being provided in addition.

* * * * *